United States Patent
Vezain et al.

(10) Patent No.: US 9,318,941 B2
(45) Date of Patent: Apr. 19, 2016

(54) DOUBLE ROTOR STEPPING MOTOR

(71) Applicant: THALES, Neuilly sur Seine (FR)

(72) Inventors: Stephane Vezain, Cannes la Bocca (FR); Yannick Baudasse, Cannes la Bocca (FR); Yasmina Gafari, Cannes la Bocca (FR)

(73) Assignee: THALES, Courbevoie (FR)

( * ) Notice: Subject to any disclaimer, the term of this patent is extended or adjusted under 35 U.S.C. 154(b) by 393 days.

(21) Appl. No.: 14/094,399

(22) Filed: Dec. 2, 2013

(65) Prior Publication Data

US 2014/0152129 A1 Jun. 5, 2014

(30) Foreign Application Priority Data

Dec. 5, 2012 (FR) .................................. 12 03295

(51) Int. Cl.
*H02K 37/04* (2006.01)
*H02K 37/14* (2006.01)
*H02K 16/02* (2006.01)

(52) U.S. Cl.
CPC .............. *H02K 37/14* (2013.01); *H02K 16/025* (2013.01); *H02K 37/04* (2013.01)

(58) Field of Classification Search
None
See application file for complete search history.

(56) References Cited

U.S. PATENT DOCUMENTS

| 3,293,460 | A | * | 12/1966 | Iwai | H01H 67/06 310/164 |
|---|---|---|---|---|---|
| 3,801,842 | A | * | 4/1974 | Touchman | H02K 37/04 310/49.19 |
| 5,128,570 | A | * | 7/1992 | Isozaki | H02K 37/18 310/180 |
| 5,315,192 | A | * | 5/1994 | Satomi | H02K 37/04 310/49.44 |
| 6,548,923 | B2 | * | 4/2003 | Ohnishi | H02K 37/18 310/252 |
| 6,700,272 | B1 | | 3/2004 | Lindner | |
| 7,342,330 | B2 | * | 3/2008 | Sakamoto | H02K 37/18 310/49.33 |
| 2010/0066184 | A1 | | 3/2010 | Sakamoto et al. | |

FOREIGN PATENT DOCUMENTS

| FR | 2724783 A1 | 3/1996 | |
|---|---|---|---|
| JP | 2009100621 A | * 5/2009 | H02K 37/00 |

* cited by examiner

*Primary Examiner* — Tran Nguyen
(74) *Attorney, Agent, or Firm* — Baker & Hostetler LLP

(57) ABSTRACT

In precision mechanical actuators, wherein a high precision stepping motor can notably be used in the actuating mechanisms of artificial satellites, a stepping motor comprises two rotors that rotate in opposite directions to generate a low-amplitude movement between one of the rotors and a stator. The first rotor comprises a first set of teeth distributed at a first pitch $p_1$ and a second set of teeth distributed at a second pitch $p_2$. The stator comprises N stator contacts comprising a plurality a of teeth distributed at the pitch $p_1$, distributed at a third pitch equal to $p_1(a+1/N)$, and able to cooperate with the teeth of the first set. The second rotor comprises N rotor contacts comprising a plurality b of teeth distributed at the pitch $p_2$, distributed at a fourth pitch equal to $p_1(b+1/N)$, and able to cooperate with the teeth of the second set of the first rotor.

7 Claims, 9 Drawing Sheets

DOUBLE ROTOR STEPPING MOTOR

CROSS-REFERENCE TO RELATED APPLICATION

This application claims priority to foreign French patent application No. FR 1203295, filed on Dec. 5, 2012, the disclosure of which is incorporated by reference in its entirety.

FIELD OF THE INVENTION

The invention lies in the field of precision mechanical actuators. It relates to a high precision stepping motor and can notably be used in the actuating mechanisms of artificial satellites.

BACKGROUND

Artificial satellites generally require numerous actuating devices. These devices may notably serve to deploy panels from a storage configuration to a deployed configuration, to orient pointing mechanisms in various directions, or to actuate elements of optical instruments such as mirrors. Generally, the context of space imposes constraints in terms of power consumption, reliability, weight and size. In addition, actuating devices often have to have high precision, that is to say a low angular resolution in the case of rotary motors. Stepping motors are commonly used as mechanical actuators for aerospace applications. Specifically, this type of motor has a number of advantages, such as low friction, a possibility of holding position without consuming power, and simplicity of control. In particular, no automatic control is necessary to hold a particular position. Stepping motors also have low angular resolution, which can reach several tenths of a degree. However, a decrease in the angular resolution is accompanied by an increase in the size and the mass of the motor. In addition, finer angular resolutions may be necessary. One solution consists in adding a mechanical reducing gear at the output of the stepping motor. However, the introduction of a reducing gear involves a decrease in the energy efficiency on account of the friction which it entails, and an increase in the weight and size. Another solution consists in the microstep control of the stepping motor. This solution requires more expensive electronics and does not make it possible to maintain a holding torque without a power supply.

SUMMARY OF THE INVENTION

One aim of the invention is notably to remedy all or some of the abovementioned drawbacks by proposing a stepping motor that affords a very low angular resolution while having a simple mechanical design and simple electronic control, a limited size, and a possibility of holding position without consuming power. To this end, the subject of the invention is a double rotor stepping motor having a differential movement. More specifically, the subject of the invention is a stepping motor comprising:
- a stator comprising N stator contacts, where N is an integer greater than or equal to three,
- a first rotor which is able to move with respect to the stator about an axis, the first rotor comprising a first set of teeth distributed at a first pitch $p_1$, and a second set of teeth distributed at a second pitch $p_2$, and
- a second rotor which is able to move with respect to the first rotor about the axis, the second rotor comprising N rotor contacts, the N stator contacts comprising a plurality a of teeth distributed at the pitch $p_1$, where a is an integer, the N stator contacts being distributed on the stator at a third pitch equal to $p_1(a+1/N)$, the teeth of the first set being able to be aligned individually with one of the stator contacts, the passage from one alignment to a consecutive alignment causing the first rotor to move in a first direction with respect to the stator by the pitch $p_1/N$, the N rotor contacts comprising a plurality b of teeth distributed at the pitch $p_2$, where b is an integer, the N rotor contacts being distributed on the second rotor at a fourth pitch equal to $p_2(b+1/N)$ and being able to be aligned individually with one of the teeth of the second set, the passage from one alignment to a consecutive alignment causing the second rotor to move in a second direction, opposite to the first direction, with respect to the first rotor by the pitch $p_2/N$.

According to one particular embodiment, the movements between the stator, the first rotor and the second rotor are rotational movements about the axis.

Each stator contact may comprise a first ring portion, an internal surface of which is toothed with the pitch $p_1$, the teeth of the ring portion being able to be aligned with teeth of the first set of the first rotor. Each stator contact may also comprise a second ring portion, an internal surface of which is toothed with the pitch $p_1$, the second ring portion being disposed symmetrically about the axis with respect to the first ring portion, the teeth of the second ring portion being able to be aligned with teeth of the first set of the first rotor. The first rotor and the second rotor may thus each have N concentric rings distributed along the axis and electromagnetically isolated from one another, the first and second ring portions of each stator contact being aligned with one of the rings of the first rotor and with one of the rings of the second rotor so as to allow a magnetic field to flow between the first ring portion and the second ring portion.

According to one particular embodiment, the first rotor comprises two parts that rotate as one about the axis, each part having N concentric rings distributed along the axis and electromagnetically isolated from one another, an external surface of each ring comprising teeth distributed at the pitch $p_1$ and aligned between the various rings, an internal surface of each ring comprising teeth distributed at the pitch $p_2$ and aligned between the various rings, the second rotor comprising two parts that rotate as one about the axis, each part of the second rotor having N concentric rings distributed along the axis and electromagnetically isolated from one another, an external surface of each ring comprising teeth distributed at the pitch $p_2$ and offset with respect to the teeth of the other rings by the pitch $p'_2$, each ring of the first rotor being aligned with one of the rings of the second rotor.

Moreover, each stator contact may comprise four concentric ring portions, each ring portion being toothed with the pitch $p_1$, for each stator contact, a first ring portion and a second ring portion being disposed symmetrically about the axis and cooperating with one of the rings of the first part of the first rotor and with one of the rings of the first part of the second rotor, a third ring portion and a fourth ring portion being disposed symmetrically about the axis and cooperating with one of the rings of the second part of the first rotor and with one of the rings of the second part of the second rotor.

The invention has notably the advantage that it allows full pitch control of the stepping motor, with said stepping motor having a very small angular movement between the second rotor and the stator between two successive power supply phases.

BRIEF DESCRIPTION OF THE DRAWINGS

The invention will be better understood and further advantages will become apparent from reading the following description which is given with reference to the attached drawings, in which.

DETAILED DESCRIPTION

Figure 1:
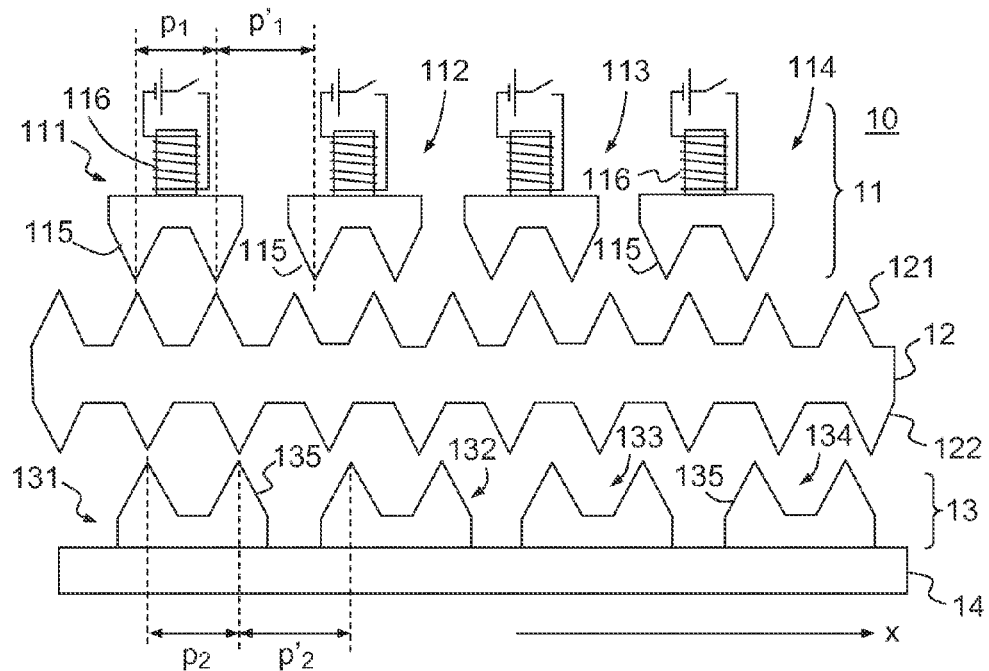
FIG. 1 shows, in the form of a simplified block diagram, a first example of a stepping motor according to the invention.

FIG. 1 shows, in the form of a simplified block diagram, a first example of a stepping motor according to the invention. The motor is shown here in the form of a linear motor. However, it may also be a rotary motor in a flat development. The stepping motor 10 shown in FIG. 1 comprises a stator 11, a first rotor 12 and a second rotor 13 having a permanent magnet 14. The stator 11 has four stator contacts 111 to 114. Each stator contact 111-114 comprises two teeth 115 which are spaced apart from one another by a pitch $p_1$, and a coil 116 that can be supplied with an electric current in order to create an electromagnetic field. The stator contacts 111-114 are distributed on the stator 11 at a pitch $p_1(2+1/N)$. More specifically, the stator contacts are disposed such that one of the teeth 115 of a stator contact 111-114 is located at a distance $p'_1$ from a contiguous stator contact. The pitch $p'_1$ is determined as a function of the pitch $p_1$ and the number N of stator contacts. It is equal to $(1+1/N).p_1$ or, in the example of FIG. 1, $(1+1/4).p_1$. The first rotor 12, also known as the intermediate rotor, is in sliding connection with respect to the stator 11 along an axis X (or in pivoting connection about an axis orthogonal to the axis X in the case of a rotary motor). The sliding connection should be understood broadly, that is to say that the connection must comprise at least one degree of freedom in translation along the axis X. The intermediate rotor 12 comprises a first set of teeth 121 distributed at the pitch $p_1$ and positioned opposite the teeth 115 of the stator contacts 111-114. On account of the difference between the pitches $p_1$ and $p'_1$, it is not possible for the teeth 115 of all of the stator contacts 111-114 to be aligned simultaneously with the teeth 121 of the intermediate rotor 12. For each step of the motor, two teeth 121 are aligned with the teeth 115 of one of the stator contacts 111-114. The intermediate rotor 12 also comprises a second set of teeth 122 distributed at a pitch $p_2$ which is different from the pitch $p_1$. The second rotor 13, also known as the central rotor, is in sliding connection with respect to the intermediate rotor 12 along the axis X (or in pivoting connection in the case of a rotary motor). It is thus also in sliding connection with respect to the stator 11. The central rotor 13 comprises four sets 131 to 134 of teeth 135, known as rotor contacts, by analogy with the stator contacts 111-114. Generally, the central rotor 13 comprises N rotor contacts, or as many rotor contacts as there are stator contacts. Each rotor contact 131-134 comprises two teeth 135 that are spaced apart from one another by the pitch $p_2$. The rotor contacts 131-134 are distributed at a pitch $p_2(2+1/N)$. More specifically, the rotor contacts are disposed such that one of the teeth 135 of a rotor contact 131-134 is located at a distance $p'_2$ from a contiguous rotor contact. The pitch $p'_2$ is determined as a function of the pitch $p_2$ and of the number N of rotor contacts and stator contacts. It is equal to $(1+1/N).p_2$ or, in the example of FIG. 1, $(1+1/4).p_2$. On account of the difference between the pitches $p_2$ and $p'_2$, it is not possible for the teeth 135 of all of the rotor contacts 131-134 to be aligned simultaneously with the teeth 122 of the intermediate rotor 12. For each step of the motor, two teeth 122 are aligned with the teeth 135 of one of the rotor contacts 131-134. The permanent magnet 14 is attached to the central rotor 13 so as to create or increase the flow of the magnetic current between the stator contacts 111-114 and the rotor contacts 131-134.

Figure 2:
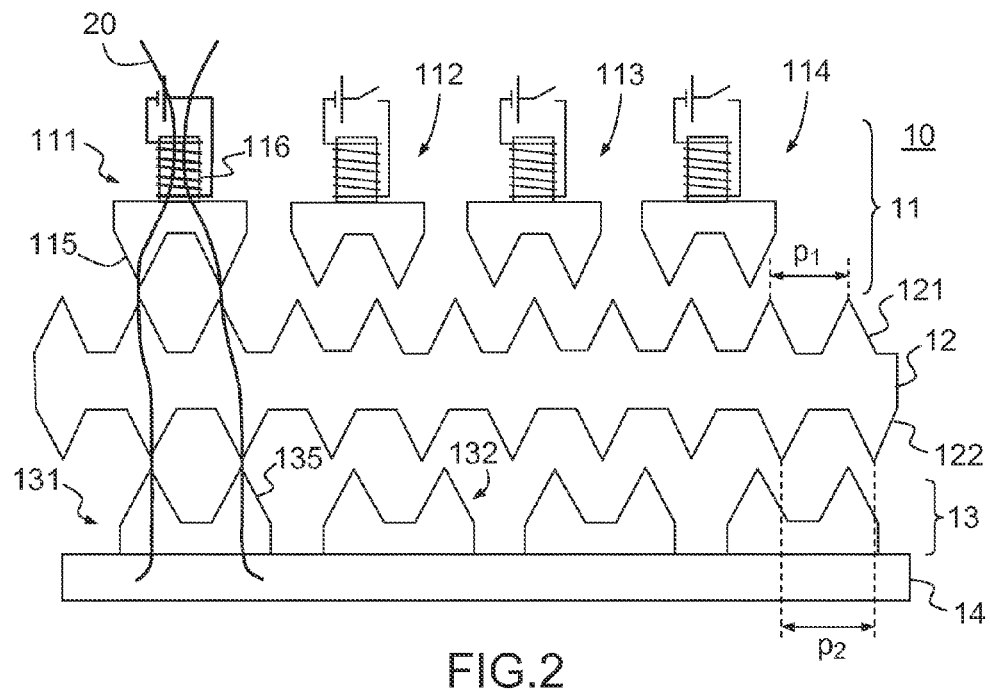
FIGS. 2 to 6 illustrate the operation of the stepping motor from FIG. 1 during various power supply phases.

FIGS. 2 to 6 illustrate the operation of the stepping motor 10 schematically shown in FIG. 1 during the successive power supply phases thereof. A phase corresponds to a period of time during which a coil 116 of one of the stator contacts 111-114 is supplied with power. The coil itself may also be known as a "phase". During each phase, the intermediate rotor 12 and the central rotor 13 are positioned so as to minimize the reluctance between one of the stator contacts 111-114 and the corresponding rotor contact 131-134. FIG. 2 shows the respective positions of the stator 11, the intermediate rotor 12 and the central rotor 13 during a first phase, specifically when the coil 116 of the stator contact 111 is supplied with power. In order to minimize the reluctance between the stator contact 111 and the rotor contact 131, two teeth 121 of the intermediate rotor 12 are aligned with the teeth 115 of the stator contact 111, and two teeth 122 of the intermediate rotor 12 are aligned with the teeth 135 of the rotor contact 131. The magnetic field 20 established between the stator contact 111 and the rotor contact 131 is thus at a maximum.

Figure 3:
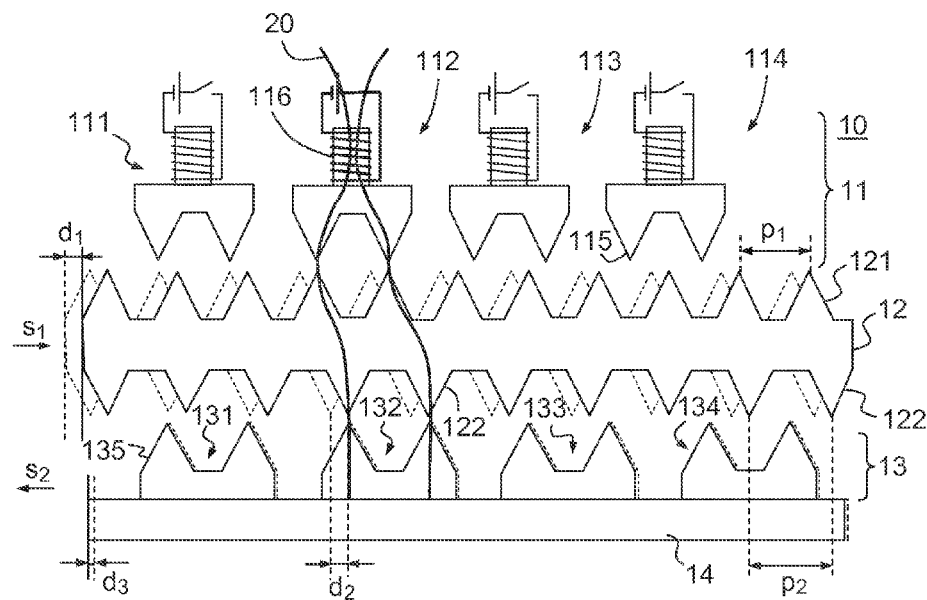

FIG. 3 shows the stepping motor 10 during the second phase, that is to say when the coil 116 of the second stator contact 112 is supplied with power. The positions of the intermediate rotor 12 and of the central rotor 13 during the first phase are shown by dashed lines. In order to minimize the reluctance between the stator contact 112 and the rotor contact 132, two teeth 121 of the intermediate rotor 12 are aligned with the teeth 115 of the stator contact 112, and two teeth 122 of the intermediate rotor 12 are aligned with the teeth 135 of the rotor contact 132. Conventionally, the passage from the first alignment between the teeth 115 of the stator contact 111 and the teeth 121 of the intermediate rotor 12, to the second alignment between the teeth 115 of the stator contact 112 and the teeth 121 of the intermediate rotor 12 causes the intermediate rotor 12 to move with respect to the stator 11 by a distance $d_1$ equal to $p_1/N$, or in this case $p_1/4$. Analogously, the passage from the first alignment between the teeth 122 of the intermediate rotor 12 and the teeth 135 of the rotor contact 131, to the second alignment between the teeth 122 of the intermediate rotor 12 and the teeth 135 of the rotor contact 132 causes the central rotor 13 to move with respect to the intermediate rotor 12 by a distance $d_2$ equal to $p_2/N$, or in this case $p_2/4$. In as much as the difference between the pitches $p_1$ and $p_2$ is relatively small, the intermediate rotor 12 is driven in a first direction $S_1$ and the central rotor 13 is driven in a second direction $S_2$, opposite to the first direction. Thus, the resultant movement of the central rotor 13 with respect to the stator 11 is less than each of the two relative movements. The distance $d_3$ covered by the central rotor 13 with respect to the stator 11 is equal to the distance $(d_2-d_1)$, that is to say $(p_2-p_1)/N$. It follows that the distance $d_3$ may be chosen to be as small as desired by choosing appropriate values of the pitches $p_1$ and $p_2$.

Figure 4:
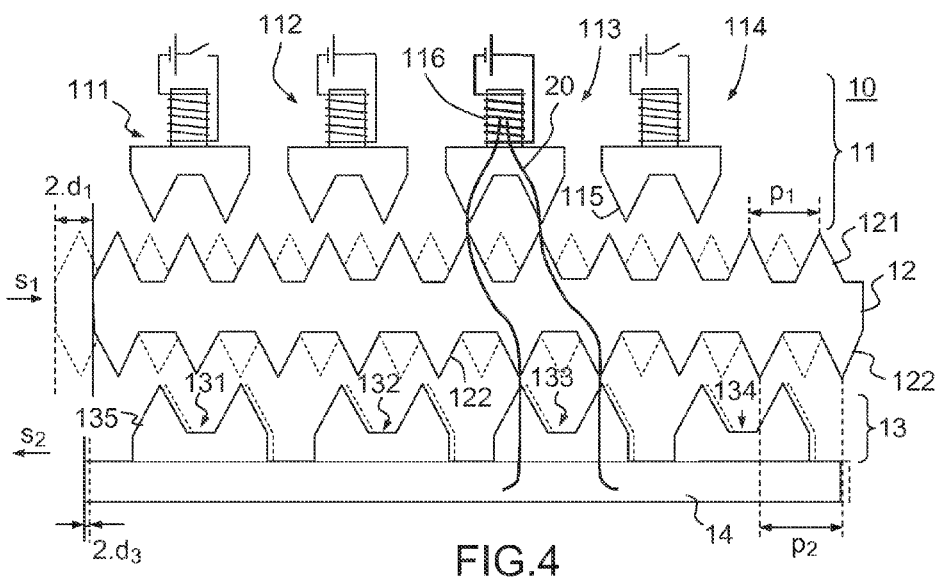

FIG. 4 shows the stepping motor 10 during the third phase, that is to say when the coil 116 of the third stator contact 113 is supplied with power. The intermediate rotor 12 and the central rotor 13 are again shown by way of dashed lines in the positions which they occupied during the first phase. During this third phase, it is the teeth 115 of the stator contact 113 which are aligned with teeth 121 of the intermediate rotor 12, and it is the teeth 135 of the rotor contact 133 which are aligned with teeth 122 of the intermediate rotor 12. The passage from the alignments of the second phase to the alignments of the third phase causes the intermediate rotor 12 to move again with respect to the stator 11 by the distance $d_1$ and in the direction $S_1$, and the central rotor 13 to move again with respect to the intermediate rotor 12 by the distance $d_2$ and in the direction $S_2$. The central rotor 13 has thus undergone a movement equal to $2.(d_2-d_1)$ since the first phase.

Figure 5:
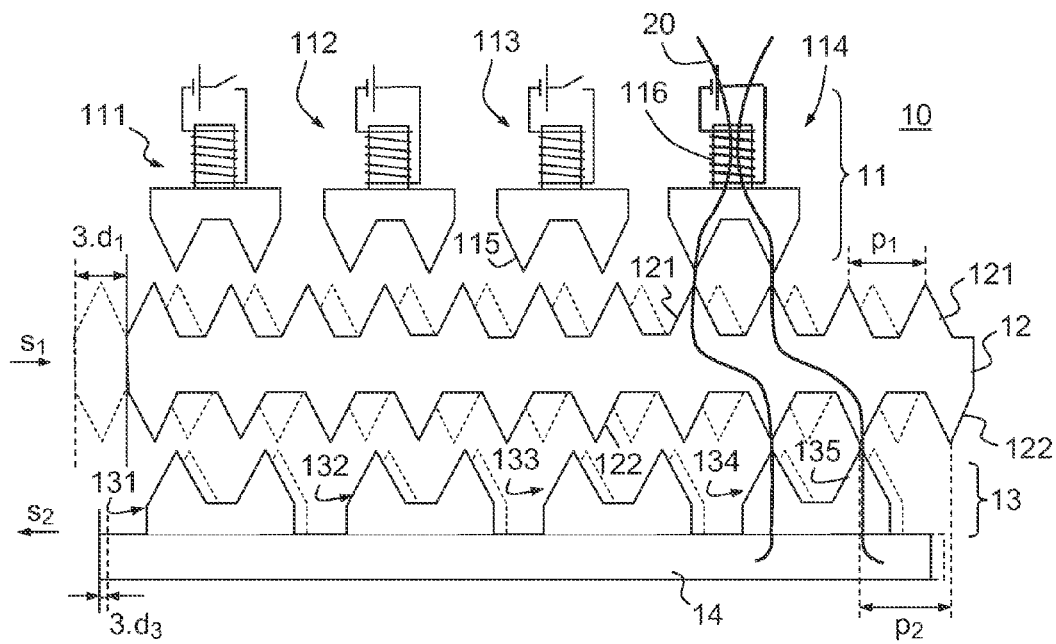

FIG. 5 shows the stepping motor 10 during the fourth phase, that is to say when the coil 116 of the fourth stator contact 114 is supplied with power. In this phase, the teeth 115 of the stator contact 114 are aligned with teeth 121 of the intermediate rotor 12, and the teeth 135 of the rotor contact 134 are aligned with teeth 122 of the intermediate rotor 12. The passage from the alignments of the third phase to the alignments of the fourth phase causes the intermediate rotor 12 to move again with respect to the stator 11 by the distance $d_1$ and in the direction $S_1$, and the central rotor 13 to move again with respect to the intermediate rotor 12 by the distance $d_2$ and in the direction $S_2$. The central rotor 13 has thus undergone a movement equal to $3.(d_2-d_1)$ since the first phase.

Figure 6:
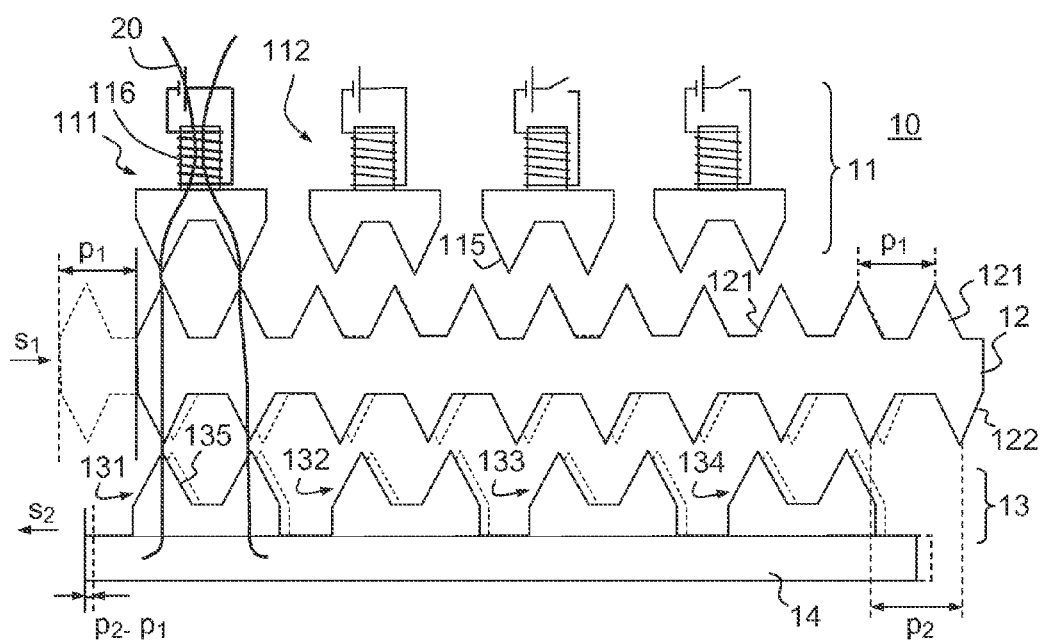

FIG. 6 shows the stepping motor 10 during the fifth phase. This phase corresponds in fact to the first phase, in which the coil of the first stator contact 111 is supplied with power. The same alignments as those of the first phase are obtained. The successive passages from the first to the fifth phase have thus caused the intermediate rotor 12 to move with respect to the stator 11 by the distance $p_1$—or $4.d_1$—and in the direction $S_1$, and the central rotor 13 to move with respect to the intermediate rotor 12 by the distance $p_2$—or $4.d_2$—and in the direction $S_2$. Consequently, the movement of the central rotor 13 with respect to the stator 11 is equal to $p_2-p_1$.

The exemplary embodiment of the stepping motor in FIG. 1 may be generalized. In particular, as indicated above, the invention may be applied to rotary stepping motors. In such a case, the movements of the rotors are rotary movements, and the pitches in question are angular pitches. Furthermore, a number N of rotor contacts and stator contacts equal to 4 was considered. However, the number N may have any integer value greater than or equal to 3. Generally, each stator contact and each rotor contact may comprise one or more teeth. With a being an integer representing the number of teeth of each stator contact, the stator contacts are distributed on the stator at a pitch equal to $p_1(a+1/N)$. Similarly, with b being an integer representing the number of teeth of each rotor contact, the rotor contacts are distributed on the rotor at a pitch equal to $p_2(b+1/N)$. Preferably, the rotor contacts and stator contacts comprise the same number of teeth. When a contact comprises a plurality of teeth, these teeth are distributed at the pitch $p_1$ or $p_2$, depending on whether it is a stator contact or rotor contact, respectively. Each tooth positioned at the end of the plurality of teeth of a stator contact must be at the distance $p'_1$ from one of the teeth of a consecutive stator contact. Similarly, each tooth positioned at the end of the plurality of teeth of a rotor contact must be at the distance $p'_2$ from one of the teeth of a consecutive rotor contact. The pitches $p'_1$ and $p'_2$ were indicated as being equal to $(1+1/N).p_1$ and $(1+1/N).p_2$, respectively. However, on account of the periodicity of the teeth of the intermediate rotor and of the central rotor, these pitches may also be equal to $p_1/N$ and $p_2/N$, respectively. The teeth of the stator, of the intermediate rotor and of the central rotor were shown schematically in the form of triangles in FIGS. 1 to 6. However, any other shape of tooth may be used within the scope of the invention. More generally, the teeth may be replaced by any means that is able to generate positions having a reluctance less than that of the other positions. In particular, materials having different electromagnetic properties may be used. By way of example, the pitch $p_2$ may be equal to 1.1 times the pitch $p_1$. The difference between the pitches $p_1$ and $p_2$ may be adapted depending on the desired angular resolution between the stator and the central rotor.

Figure 7:
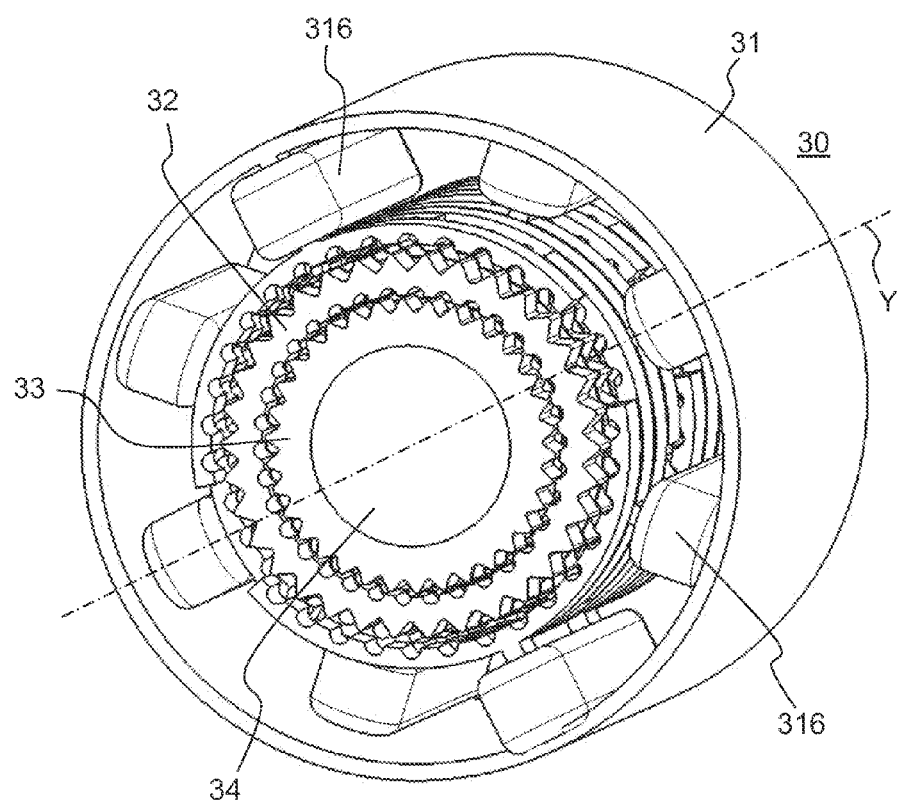
FIG. 7 shows a second example of a stepping motor according to the invention.

FIG. 7 shows a second exemplary embodiment of a stepping motor according to the invention. In this case, it is a rotary stepping motor having variable reluctance and staged rotors. The stepping motor 30 comprises a stator 31, an intermediate rotor 32 and a central rotor 33 having a permanent magnet 34. The permanent magnet 34 is secured to the central rotor 33. The rotors 32 and 33 are in pivoting connection with respect to the stator 31 about an axis Y.

Figure 8:
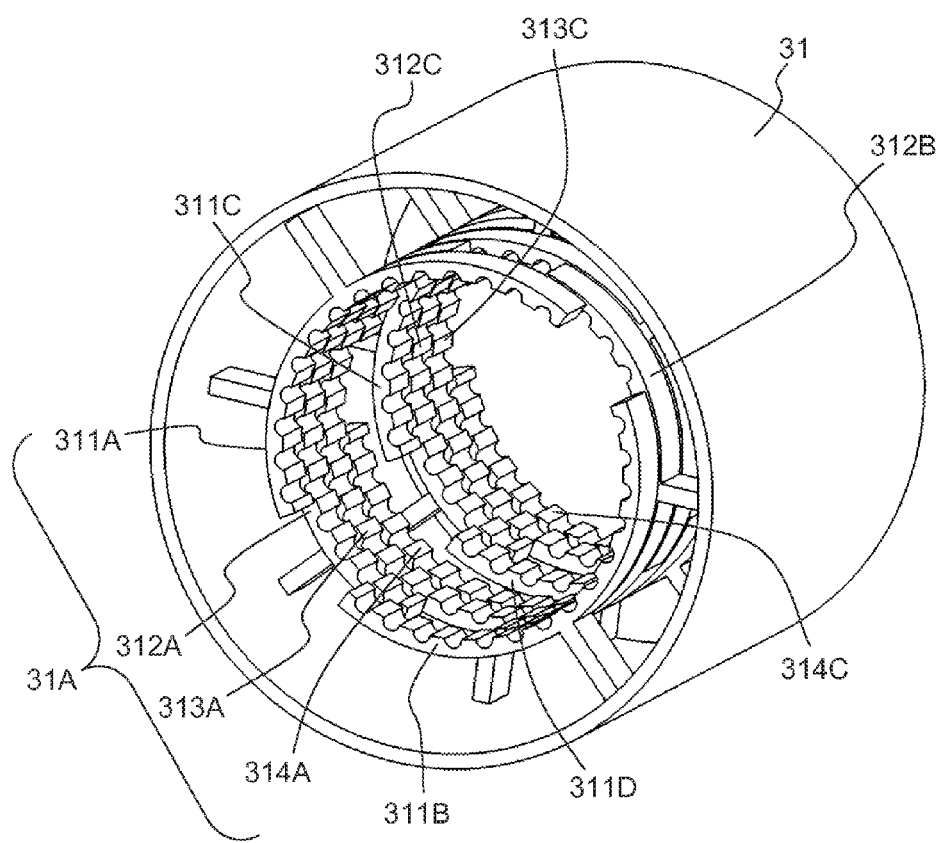
FIGS. 8 and 9 show a perspective view and a sectional view, respectively, of a stator of the stepping motor from FIG. 7.
Figure 9:
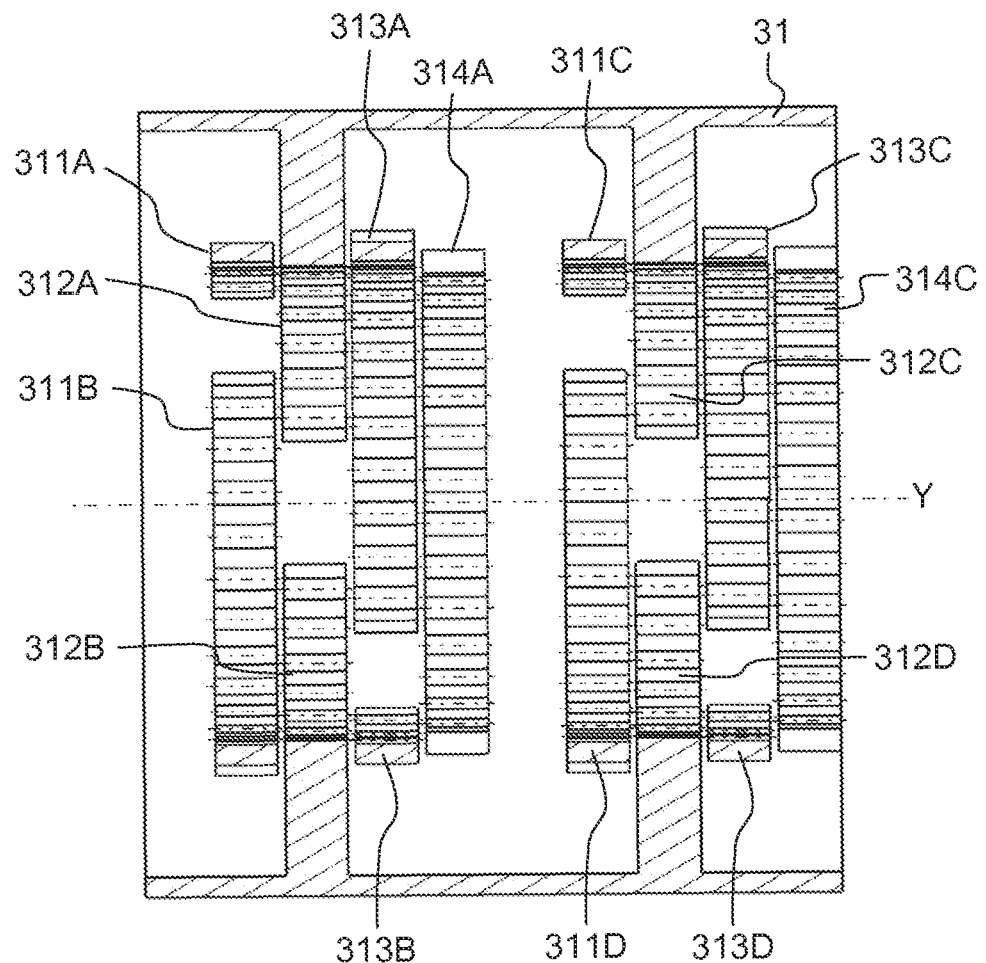

FIGS. 8 and 9 show the stator 31 of the motor 30 from FIG. 7 in a perspective view and in a sectional view along the axis Y, respectively. The stator 31 comprises four stator contacts 311, 312, 313 and 314. Each stator contact 311-314 has four ring portions 311A-311D, 312A-312D, 313A-313D and 314A-314D, respectively. These ring portions are generically denoted 31A-31D. Each ring portion 31C is offset in translation along the axis Y from the corresponding ring portion 31A. The ring portions 31B and 31D are positioned facing each ring portion 31A and 31C, respectively. Each ring portion is toothed at one and the same pitch $p_1$. The teeth of the ring portion 312A are angularly offset from the teeth of the ring portion 311A by a pitch $p'_1$. The pitch $p'_1$ is equal to $1/4.p_1$. More generally, the angular offset is equal to $1/N.p_1$, where N is the number of stator contacts. Similarly, the teeth of the ring portions 313A and 314A are angularly offset from the teeth of the ring portions 312A and 313A, respectively, by the pitch $p'_1$. The same goes for the ring portions 311B-314B, 311C-314C, and 311D-314D. The teeth of the ring portions 31A are aligned with the teeth of the respective ring portions 31C, and the teeth of the ring portions 31B are aligned with the teeth of the ring portions 31D. The stator also comprises eight coils 316 which are supplied with power in pairs. A first coil 316 makes it possible to supply power to the ring portions 311A and 311C. A second coil 316 makes it possible to supply power to the ring portions 311B and 311D. Analogously, the six other coils make it possible to supply power individually to the ring portions 312A and 312C, 312B and 312D, 313A and 313C, 313B and 313D, 314A and 314C, and 314B and 314D.

Figure 10:
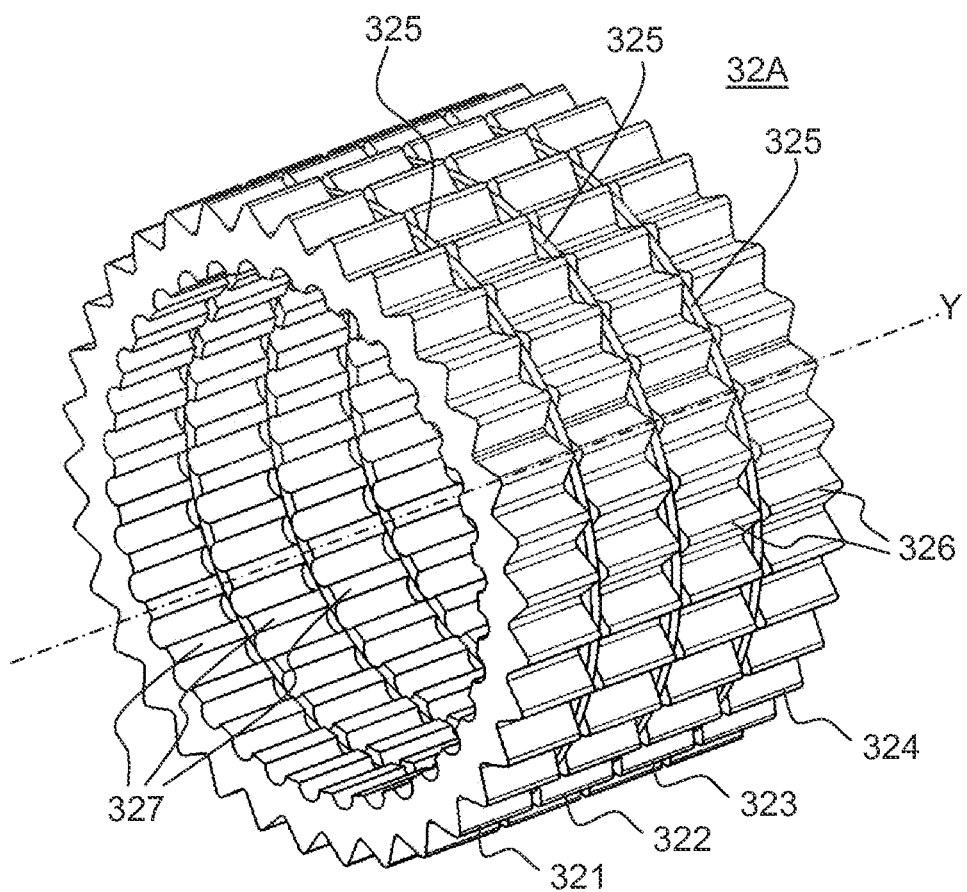
FIG. 10 shows a part of an intermediate rotor of the stepping motor from FIG. 7.

FIG. 10 shows a perspective view of a part 32A of the intermediate rotor 32. The part 32A comprises four concentric rings, known as stages 321 to 324, distributed along the axis Y and rotating as one about the axis Y. The number of stages of the part 32A is equal to the number N of stator contacts. The stages 321-324 are electromagnetically isolated from one another by spacers 325. The external surface of each ring 321-324 carries a set of teeth 326 distributed at the pitch $p_1$. The teeth 326 of each stage 321-324 are aligned with those of the other stages. The internal surface of each ring 321-324 carries a set of teeth 327 distributed at the pitch $p_2$. The teeth 327 of each stage 321-324 are aligned with those of the other stages. The intermediate rotor 32 comprises two parts 32A and 32B which rotate as one about the axis Y. The part 32B, not shown, is identical to the part 32A. The part 32A is aligned with the ring portions 31A and 31B, and the part 32B is aligned with the ring portions 31C and 31D. More specifically, the stages 321-324 of the part 32A are respectively positioned opposite the ring portions 311A and 311B, 312A and 312B, 313A and 313B, and 314A and 314B. The stages 321-324 of the part 32B are respectively positioned opposite the ring portions 311C and 311D, 312C and 312D, 313C and 313D, and 314C and 314D. The intermediate rotor 32 is dimensioned such that the teeth 326 can cooperate with the teeth of the ring portions 31A-31D.

Figure 11:
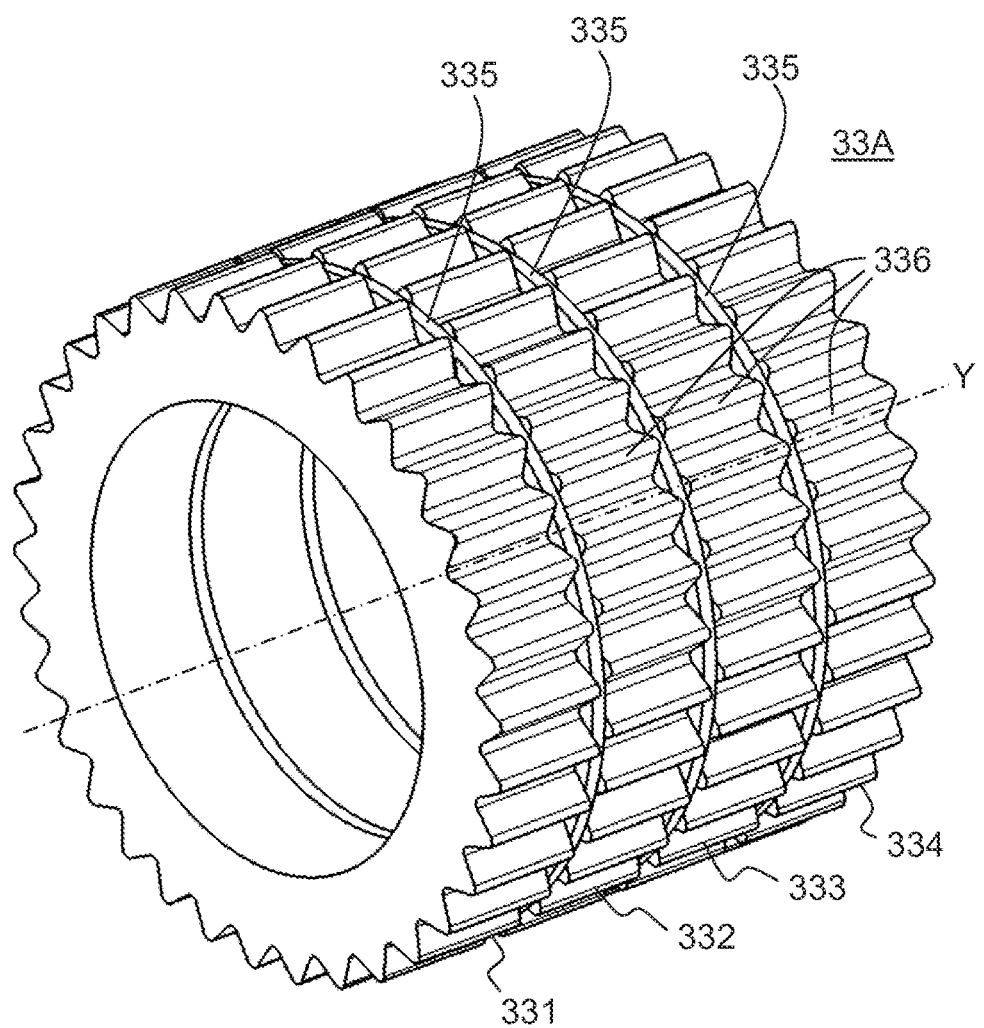
FIG. 11 shows a part of a central rotor of the stepping motor from FIG. 7.

FIG. 11 shows a perspective view of a part 33A of the central rotor 33. The part 33A comprises four concentric rings, known as stages 331 to 334, distributed along the axis Y and rotating as one about the axis Y. More generally, the part 33A comprises as many stages as the number N of stator contacts. The stages 331-334 are electromagnetically isolated from one another by spacers 335. The external surface of each ring 331-334 carries a set of teeth 336 distributed at the pitch $p_2$. The teeth 336 of each stage 331-334 are offset by a pitch $p'_2$, equal to $1/4.p_2$ or, more generally, $1/N.p_2$. The central rotor comprises two parts 33A and 33B that rotate as one about the axis Y. The part 33B, not shown, is identical to the part 33A. The part 33A is aligned with the part 32A of the intermediate rotor 32, and the part 33B is aligned with the part 32B of the intermediate rotor 32. The central rotor 33 is dimensioned such that the teeth 336 can cooperate with the teeth 327 of the intermediate rotor 32. The stepping motor 30 thus operates analogously to the stepping motor 10 illustrated in FIGS. 1 to 6.

Figure 12:
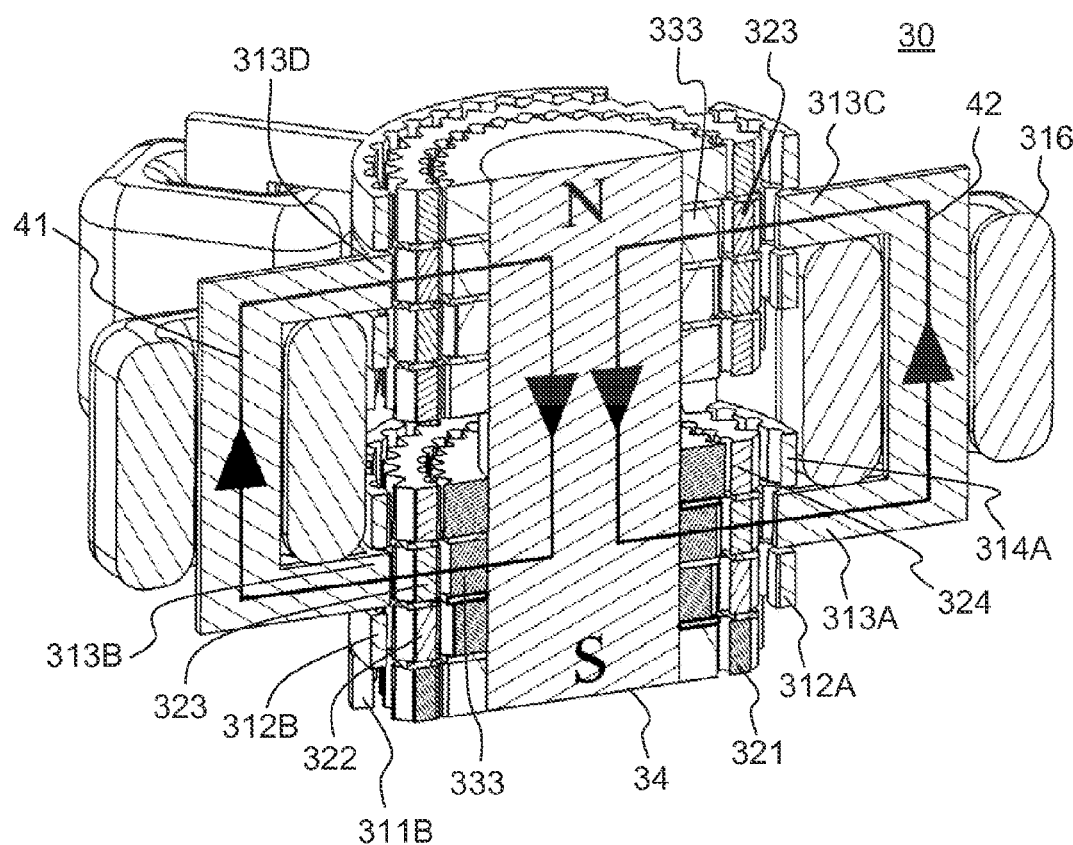
FIG. 12 illustrates a longitudinal sectional view of the operation of the stepping motor from FIG. 7.

FIG. 12 illustrates a longitudinal sectional view along the axis Y of the operation of the stepping motor 30 in a third power supply phase. In this phase, the teeth of the ring portions 313A, 313B, 313C and 313D are aligned with the teeth 326 of the rings 323 of the two parts 32A and 32B of the intermediate rotor 32. Moreover, the teeth 327 of these same rings 323 are aligned with the teeth 336 of the rings 333 of the two parts 33A and 33B of the central rotor 33. Field lines 41 and 42 can thus flow between the stator 31, the intermediate rotor 32, the central rotor 33 and the permanent magnet 34.

By studying FIG. 12, it will be understood that the stepping motor 30 could be modified without departing from the scope of the invention. For example, the intermediate rotor 32 and the central rotor 33 may have only a single part of N stages, and the stator 31 may have only the eight ring portions 31A and 31B. The field lines are thus established between the ring portions 31A and 31B. By contrast, it is possible for the stepping motor only to have the ring portions 31A and 31C, or 31B and 31D. The two intermediate rotor 32 and central rotor 33 parts are thus necessary. Furthermore, the number N of stages and of stator contacts may have any integer value greater than or equal to 3. Moreover, the shapes of the teeth may differ from those shown in FIGS. 7 to 11.

The invention claimed is:

1. A stepping motor comprising:
 a stator comprising N stator contacts, where N is an integer greater than or equal to three,
 a first rotor which is able to move with respect to the stator about an axis, the first rotor comprising a first set of teeth distributed at a first pitch $p_1$, and a second set of teeth distributed at a second pitch $p_2$, and
 a second rotor which is able to move with respect to the first rotor about the axis, the second rotor comprising N rotor contacts,
 the N stator contacts comprising a plurality a of teeth distributed at the pitch $p_1$, where a is an integer, the N stator contacts being distributed on the stator at a third pitch equal to $p_1(a+1/N)$, the teeth of the first set being able to be aligned individually with one of the stator contacts, the passage from one alignment to a consecutive alignment causing the first rotor to move in a first direction with respect to the stator by the pitch $p_1/N$,
 the N rotor contacts comprising a plurality b of teeth distributed at the pitch $p_2$, where b is an integer, the N rotor contacts being distributed on the second rotor at a fourth pitch equal to $p_2(b+1/N)$ and being able to be aligned individually with one of the teeth of the second set, the passage from one alignment to a consecutive alignment causing the second rotor to move in a second direction, opposite to the first direction, with respect to the first rotor by the pitch $p_2/N$.

2. The stepping motor according to claim 1, wherein the third pitch and the fourth pitch have the same value, and wherein the movements between the stator, the first rotor and the second rotor are rotational movements about the axis.

3. The stepping motor according to claim 2, wherein each stator contact comprises a first ring portion, an internal surface of which is toothed with the pitch $p_1$, the teeth of the ring portion being able to be aligned with teeth of the first set of the first rotor.

4. The stepping motor according to claim 3, wherein each stator contact comprises a second ring portion, an internal surface of which is toothed with the pitch $p_1$, the second ring portion being disposed symmetrically about the axis with respect to the first ring portion, the teeth of the second ring portion being able to be aligned with teeth of the first set of the first rotor.

5. The stepping motor according to claim 4, wherein the first rotor and the second rotor each have N concentric rings distributed along the axis and electromagnetically isolated from one another, the first and second ring portions of each stator contact being aligned with one of the rings of the first rotor and with one of the rings of the second rotor so as to allow a magnetic field to flow between the first ring portion and the second ring portion.

6. The stepping motor according to claim 2, wherein the first rotor comprises two parts that rotate as one about the axis, each part having N concentric rings distributed along the axis and electromagnetically isolated from one another, an external surface of each ring comprising teeth distributed at the pitch $p_1$ and aligned between the various rings, an internal surface of each ring comprising teeth distributed at the pitch $p_2$ and aligned between the various rings, the second rotor comprising two parts that rotate as one about the axis, each part of the second rotor having N concentric rings distributed along the axis and electromagnetically isolated from one another, an external surface of each ring comprising teeth distributed at the pitch $p_2$ and offset with respect to the teeth of the other rings by the pitch $p'_2$, each ring of the first rotor being aligned with one of the rings of the second rotor.

7. The stepping motor according to claim 6, wherein each stator contact comprises four concentric ring portions, each ring portion being toothed with the pitch $p_1$, for each stator contact, a first ring portion and a second ring portion being disposed symmetrically about the axis and cooperating with one of the rings of the first part of the first rotor and with one of the rings of the first part of the second rotor, a third ring portion and a fourth ring portion being disposed symmetrically about the axis and cooperating with one of the rings of the second part of the first rotor and with one of the rings of the second part of the second rotor.

\* \* \* \* \*